United States Patent
Lakhotia

(10) Patent No.: US 10,747,880 B2
(45) Date of Patent: Aug. 18, 2020

(54) SYSTEM AND METHOD FOR IDENTIFYING AND COMPARING CODE BY SEMANTIC ABSTRACTIONS

(71) Applicant: University of Louisiana at Lafayette, Lafayette, LA (US)

(72) Inventor: Arun Lakhotia, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 14/143,823

(22) Filed: Dec. 30, 2013

(65) Prior Publication Data

US 2015/0186648 A1 Jul. 2, 2015

(51) Int. Cl.
*G06F 21/56* (2013.01)

(52) U.S. Cl.
CPC .................. *G06F 21/563* (2013.01)

(58) Field of Classification Search
CPC .................. G06F 8/73–75; G06F 21/563
USPC .................................................. 726/22
See application file for complete search history.

(56) References Cited

U.S. PATENT DOCUMENTS

| | | | |
|---|---|---|---|
| 6,014,513 A * | 1/2000 | Voelker et al. | 717/131 |
| 6,748,584 B1 * | 6/2004 | Witchel | G06F 8/71 714/37 |
| 6,763,327 B1 * | 7/2004 | Songer et al. | 703/21 |
| 8,255,882 B2 | 8/2012 | Zhang et al. | |
| 8,271,963 B2 | 9/2012 | Kornstaedt et al. | |
| 8,321,932 B2 | 11/2012 | Bhargava et al. | |
| 8,326,603 B1 * | 12/2012 | Budzinski | G06F 17/27 704/9 |
| 8,332,828 B2 | 12/2012 | Vargas | |
| 8,443,442 B2 | 5/2013 | Wang et al. | |
| 8,666,999 B2 * | 3/2014 | Havel | G06F 8/751 707/758 |
| 2004/0221273 A1 * | 11/2004 | Sandham | G06F 9/44589 717/134 |
| 2004/0221277 A1 * | 11/2004 | Owen | G06F 9/45516 717/138 |
| 2007/0266366 A1 * | 11/2007 | Bucuvalas | G06F 8/433 717/104 |

(Continued)

FOREIGN PATENT DOCUMENTS

| | | |
|---|---|---|
| EP | 0752650 A2 | 8/1997 |
| WO | 2011035431 A1 | 3/2011 |
| WO | 2011119940 A1 | 9/2011 |

OTHER PUBLICATIONS

"An executable semantics for C is useful", http://blog.regehr.org/archives/523.

(Continued)

*Primary Examiner* — Peter C Shaw
(74) *Attorney, Agent, or Firm* — Jessica C. Engler; Russel O. Primeaux; Kean Miller LLP

(57) ABSTRACT

Certain embodiments of the present invention are configured to facilitate analyzing computer code more efficiently. For example, by conducting a first level abstraction (e.g., symbolic interpretation and algebraic simplification) and a second level abstraction (e.g., generalization) of the computer code, the analysis may more accurately account for variations in the code that may occur as a result of register renaming, instruction reordering, choice of instructions, etc. while minimizing the cost of computations required to perform the analysis.

17 Claims, 10 Drawing Sheets

(56) References Cited

U.S. PATENT DOCUMENTS

| | | | | |
|---|---|---|---|---|
| 2009/0307193 | A1* | 12/2009 | Ganjikunta | G06F 11/3688 |
| 2010/0153933 | A1* | 6/2010 | Bohlmann | G06F 8/73 |
| | | | | 717/144 |
| 2011/0231824 | A1* | 9/2011 | Chabbi | G06F 11/0751 |
| | | | | 717/126 |
| 2012/0174080 | A1 | 7/2012 | Gandolfi et al. | |
| 2012/0254827 | A1* | 10/2012 | Conrad | G06F 8/35 |
| | | | | 717/104 |
| 2012/0260106 | A1 | 10/2012 | Zaks et al. | |
| 2012/0260343 | A1 | 10/2012 | Sun et al. | |
| 2014/0201192 | A1* | 7/2014 | Hu | G06F 16/24553 |
| | | | | 707/722 |
| 2015/0178418 | A1* | 6/2015 | Gu | G06F 17/505 |
| | | | | 716/107 |
| 2016/0179653 | A1* | 6/2016 | Suzuki | G06F 8/436 |
| | | | | 717/126 |

OTHER PUBLICATIONS

"Semantic comparison of malware functions", http://blog.sei.cmu.edu/post.cfm/semantic-comparison-of-malware-functions.

"An executable operational semantics", http://gideon.smdng.nl/2009/01/an-executable-operational-semantics-for-python/.

"Frankenstein: Stitching malware from benign binaries", http://www.utdallas.edu/~hamlen/mohan12woot.pdf.

"Semantics-aware malware detection", http://www.eecs.berkeley.edu/~sseshia/pubdir/oakland05.pdf.

"BinHunt: Automatically finding semantic differences in binary programs", http://www.cs.berkeley.edu/~dawnsong/papers/2008%20binhunt_icics08.pdf.

"BitBlaze: Binary analysis for computer security", http://bitblaze.cs.berkeley.edu.

* cited by examiner

```
401290:  b8 05 00 00 00     mov   eax,0x5
401295:  81 c3 04 00 00 00  add   ebx,0x4
40129b:  6b c3              imul  eax,ebx
```

FIG. 2A

$eax = 5$
$ebx = (def(ebx) + 4) \times 5$
$\phantom{ebx} = def(ebx) \times 5 + 20$

FIG. 2B

$A = N1$
$B = def(B) \times N1 + N2$
where $N2 = N1 \times N3$
and $type(A) = type(B) = reg32$

FIG. 2C

```
eax = 5
ebx = 10
mem(def(eax)) = def(ebx)
mem(def(ebx)) = def(eax)
```

FIG. 3A

```
ebx = 10
ecx = 5
mem(def(ebx)) = def(ecx)
mem(def(ecx)) = def(ebx)
```

FIG. 3B

```
R1 = N1
R2 = N2
mem(def(R1)) = def(R2)
mem(def(R2)) = def(R1)
```

FIG. 3C

```
R = N
mem(def(R)) = def(R)
```

FIG. 3D

```
push(ebp)
mov(ebp,esp)
sub(esp,16)
mov(eax,dptr(ebp))
push(edi)
push(ebx)
mov(ebx,ebp)
mov(edi,ebx)
pop(ebx)
push(ebx)
mov(ebx,46)
sub(edi,ebx)
pop(ebx)
mov(dptr(edi+42),eax)
pop(edi)
lea(eax,wptr(ebp-16))
push(esi)
mov(esi,1634038339)
mov(dptr(eax),esi)
pop(esi)
push(esi)
mov(esi,32509012)
add(esi,1733712160)
mov(dptr(eax+4),esi)
pop(esi)
push(edx)
mov(edx,4285804)
mov(dptr(eax+8),edx)
pop(edx)
push(eax)
```

FIG. 4A

```
push(ebp)
mov(ebp,esp)
sub(esp,16)
mov(eax,dptr(ebp))
mov(dptr(ebp-4),eax)
lea(eax,wptr(ebp-16))
mov(dptr(eax),1634038339)
mov(dptr(eax + 4),1766221172)
mov(dptr(eax + 8),4285804)
push(eax)
```

FIG. 4B

```
eax = -20 + def(esp)
ebp = -4 + def(esp)
esp = -24 + def(esp)
memdw(-24 + def(esp)) = -20 + def(esp)
memdw(-20 + def(esp)) = 1634038339
memdw(-16 + def(esp)) = 1766221172
memdw(-12 + def(esp)) = 4285804
memdw(-8 + def(esp)) = def(ebp)
memdw(-4 + def(esp)) = def(ebp)

Simplifications performed
1766221172 = 32509012 + 1733712160
-50 = -4 - 46
-20 = -4 - 16
-16 = -20 + 4
-12 = -20 + 8
-8 = -50 + 42
```

FIG. 4C

```
A = -N1 + def(B)
C = -N2 + def(B)
B = -N3 + def(B)
memdw(-N3 + def(B)) = -N1 + def(B)
memdw(-N1 + def(B)) = N4
memdw(-N5 + def(B)) = N6
memdw(-N7 + def(B)) = N8
memdw(-N9 + def(B)) = def(C)
memdw(-N2 + def(B)) = def(C)
where
N6 = N10 + N11
-M12 = -N2 - N13
-N1 = -N2 - N5
-N5 = -N1 + N2
-N7 = -N1 + N9
-N9 = -N12 + N14
```

FIG. 4D

SYSTEM AND METHOD FOR IDENTIFYING AND COMPARING CODE BY SEMANTIC ABSTRACTIONS

GOVERNMENT INTEREST STATEMENT

This invention was made with government support under FA8750-10-C-0171 awarded by the Defense Advanced Research Projects Agency and Air Force Research Laboratory, FA9550-09-1-0715 awarded by the Air Force Office of Scientific Research, and FA8750-12-C-0144 awarded by the Air Force Research Laboratory. The government has certain rights in the invention.

FIELD OF THE INVENTION

The present invention relates generally to detecting certain types of computer code, breaking that code down into code fragments, abstracting the code fragments to a first level abstraction and then possibly a second level abstraction, which permits more efficient comparison of the code fragments. It also permits more efficient and faster lookup of similar code fragments in a large collection of code fragments created from a large number of programs.

BACKGROUND OF THE INVENTION

Computer programs provide many functions. For example, computer programs help people track business operations, control machinery and equipment, organize personal lives, manage networks, and communicate with other people, to name a few. Over time, computer programs are being developed to provide more and more types of or improved functions.

Computer programs generally are formed from what is called computer code. A number of different constructs for computer code are known in the art. Certain types of computer code, termed source code are configured to be easily read and manipulated by people. Other types of computer code termed machine code are made up of a series of representations configured to be read directly by a computer processor or other component of a computer system.

A person who creates a computer program typically writes the program in source code. After the source code is received by the computer system, a compiler component translates the source code into assembly level code. Another component of a computer system, an assembler, converts the assembly level code into machine code.

In other methods, a computer system generates the computer code directly as machine code and no translation is necessary.

Each construct—e.g., source code or machine code—may be written in one or more languages. Examples of source code languages are C, C++, Java, Fortran, and Javascript, to name a few. Examples of machine code languages include binary languages representing instruction set of Intel x86 architectures, ARM architecture, Java Virtual Machine, python virtual machine, to name a few.

Binary languages generally use only two types of representations, typically the numbers zero and one, repeated in some pattern to convey information. Each pattern may include one or multiple sets of representations, wherein each set of representations has a discrete meaning (e.g., a number, letter, instruction). For example, the set of representations "01000010" means capital letter "B" according to one binary language.

In certain methods using a binary language, each set of representations, known as a bit string, is formed by eight representations, each of which may be a zero or a one, and known as an eight-bit binary code. However, a bit string may be any length of representations, for example, 5, 6, 7, 8, 10, 16, or 32 representations. In such representations, every bit string may be the same length, known as fixed-length binary code, or may have varying numbers of representations in each bit string, known as variable-length binary code. A computer program consists of one or more bit strings of instructions in machine code along with other bits representing data. Such a computer program may be stored in a file on a storage device known as an executable file.

The CPU inside a computer treats a specific pattern of binary code as instruction to perform a specific operation on its registers or the memory. A register is a temporary work area easily accessible within the CPU and are given symbolic names. For instance, registers in Intel x86 architecture are named eax, ebx, ecx, ax, bx, zf, cf, etc. An Intel x86 CPU treats a certain sequence of binary code as command to add the content of registers eax and ebx, and store the result in register eax. In example of application, an executable file can be temporarily stored on a register until the specific operation is commanded for execution.

From time to time, a user may wish to have certain computer code analyzed. More specifically, a user may wish to identify malware, a computer program configured to disrupt computer operation, gather sensitive information, or gain access to private computer systems. Examples of malware include viruses, worms, Trojan horses, ransomware, rootkits, keyloggers, dialers, spyware, adware, malicious BHOs, or rogue security programs. Clearly, it would be beneficial to be able to efficiently analyze computer code to determine whether it contains malware or not.

A user may also wish to have computer code analyzed to assess what version of a program is being used by a computer system. The code may also be analyzed for purposes of preparing and applying a patch, a section of computer code configured to fix or update an existing computer program. Sometimes a patch may be distributed as an executable file, possibly configured to modify the computer code at the binary level or by completely replacing an existing executable file or computer program.

In addition, a user may wish to analyze computer code for purposes of enforcing ownership rights in the code. More specifically, many computer programs are protected by copyright or patent rights. The owner of the computer program may wish to detect and identify any other computers that are copying, distributing, or using the copyright-protected code and/or patent-protected code without the owner's permission.

Some approaches for analyzing computer code have already been developed. However, known approaches for analyzing computer code are typically associated with certain disadvantages or limitations.

Many known approaches for analyzing computer code include starting with a code section of interest, possibly formed from one or more executable files, and attempting to find a match for the code section of interest within the designated code searched, which also may be formed from one or more executable files. However, because the designated code searched may undergo minor changes, a search for identical matches of code has limited value because the results may omit many relevant code sections that are similar, though not identical to the code section of interest.

Code sections may be considered similar if the instructions are identical except for the choice of the registers, such as, eax, ebx, etc. in the Intel x86 architecture. Code sections may also be considered similar if they have instructions in different order but cause the CPU to perform the same end result. Code sections may also be considered similar if they use different instructions but the instructions collectively cause the CPU to perform the same end result. Additionally, code sections may be considered similar also when the instructions effectively produce the same end result, but relied on different memory locations. Similar code sections, such as those just described, are commonly created by compilers as a result of code reordering, register renaming, choice of instructions, and differences in compiler optimizations.

It is known in the art that it is not mathematically possible to develop a method that correctly and accurately determines two code segments to be similar if and only if they are truly similar. Hence, all known methods for comparing sections of code are inherently imprecise. A method may incorrectly determine two code sections to be similar when they are in fact not similar. Such errors are termed false positive. A method may also incorrectly determine two code sections to be different when they are in fact similar. Such errors are termed as false negatives. It is desirable to develop methods that have few false positive errors and that are also computationally efficient.

A known approach to permit analysis of sections of code is based on abstracting the code section of interest. In this approach a code section of interest is first disassembled. Disassembly typically consists of converting the computer code from binary format into an assembly format. The disassembled code—that is, code in assembly format—is decomposed into procedures. A procedure is a sequence of one or more instructions that a CPU may be directed to execute by a "CALL" instruction. The code of a procedure is then analyzed to construct a control flow graph (CFG). A CFG may be a flow chart mapping the order of actions identified in the code, in which each node in the graph represents a code fragment or basic block of code, i.e. a straight-line piece of code without any jumps or jump targets; jump targets start a block, and jumps end a block. Directed edges may be used to represent jumps in the control flow. There are, in most presentations, two specially designated blocks: the entry block, through which control enters into the flow graph; and the exit block, through which all control flow leaves.

There are many approaches known in the art that compare sections of code after decomposing them into procedures, control flow graphs, and blocks. In one method, a cryptographic hash of one or more instructions of the procedure is computed. Sections of code are compared by comparing the hashes. Clearly, such a method permits matching sections of code that have identical procedures containing identical instructions. However, the method cannot match code sections that are similar, differing only on choice of registers, order of instructions, and such variations.

In another approach, similar procedures are located using graph isomorphism. In this approach, corresponding blocks of codes of two procedures of interest are found by computing statistics related to the types of procedural instructions in a block as well as the number of in-degree and out-degree edges of each block in the CFG. By using types of instructions and their statistics, instead of the instructions themselves, such an approach is able to overcome differences due to register renaming and code reordering. Although this approach leads to very efficient comparison, it also creates significantly high false negative errors because this approach uses only the type of instructions, and not the instructions themselves in performing the comparison. There are approaches known to reduce false negative errors using statistical properties of the graph but these methods increase false positive errors.

Accordingly, additional steps to account for small differences in code may be added. In an amended approach, the instructions inside each block of code are first lifted to their operational semantics. The semantics of a segment of code is the effect of that code on the state variables, the registers and memory of the CPU and peripherals, such as, the display, printer, hard drives, etc. Given the content of the state variable before the code segment is executed, the semantics describes their content after the code segment is executed. The semantics of a code segment may be computed by composing the semantics into individual instruction. Such semantics is termed the operational semantics since it captures the intermediate values of state variables. Two code segments may be compared using their operational semantics. Such comparison is very strict since it matches only those code fragments that effect changes in the state variables in exactly the same order. Most often it is desirable to compare code fragments using denotational semantics, the net effect of a code segment on the state variables after the code segment has been executed. In this approach, a theorem prover is used to determine whether the operational semantics of two code fragments have the same net effect, i.e., have the same denotational semantics. It is also desirable to consider two code fragments to compare denotational semantics if the code fragments were modified to consistently rename the registers, such as using the register eax instead of ebx. In this amended approach, such match is determined by using a theorem prover to try all possible permutations of register names to find a match.

This method of determining similar blocks using a theorem prover to determine if the semantics of two code fragments match does not produce any false positive errors. However, the method is computationally expensive, sometimes requiring over 30 minutes of computer time to determine similarity between two code sections. As a result, these methods are not practical for finding similar code sections between very large collections of programs.

Other known systems and methods call for splitting down a larger portion of code into blocks and representing each block using an n-perm or n-gram. These methods are fast as they do not construct CFGs. They also are insensitive to register renaming and code reordering. These methods, however, produce extremely high false positive and false negative errors, rendering them ineffective for large collections of programs.

Clearly, there is a demand for an improved system and methods for comparing two or more sets of code that is not sensitive to variation in code typically introduced by compilers, that is configured to be efficient regarding time and resources necessary to conduct the comparison, and that minimizes inaccuracy in matching or the reported output results. The present invention satisfies these demands.

SUMMARY OF THE INVENTION

Certain embodiments of the present invention include a system and methods for more efficiently analyzing computer code. Such analysis may include identifying matches between a relatively small computer code of interest and generally large samples of computer code (e.g., locating malware). The analysis also may include detecting differences between two versions of the same or similar computer program.

More generally, the system and methods of the present invention include a first level abstraction of a section of computer code into its denotational semantics. The denotational semantics is more easily analyzed relative to the code in a binary format or in disassembled form. Two blocks of code that are equivalent but use different instructions or instructions in different order will have the same denotational semantics. The system and methods of the present invention further includes a second level abstraction of a section of computer code into generalized semantics. The generalized semantics is computed by consistently replacing each register name and/or constant literals in the denotational semantics by logical variables. Two sections of code that are equivalent except for their choice of registers and/or memory addresses will have the same generalized semantics. The generalized semantics provides a significantly more efficient means for more accurately matching code segments than prior art. In a preferred embodiment of the invention, the denotational semantics and generalized semantics are computed for blocks of code contained in CFGs constructed after disassembling the section of code, decomposing it into procedures.

After a first level abstraction or both first and second level abstractions, the code section of interest and the established code can be compared to each other more quickly and easily. Indeed, the code section of interest and established code may be quickly and easily compared to any other section of code which has been disassembled, decomposed, and abstracted. The first level abstractions and second level abstractions can also be used as database indexes, thus enabling very fast and accurate searches for similar code sections in large collections of code.

One object of certain embodiments of the present invention is facilitating simplified analysis of computer code.

Another object of certain embodiments of the present invention is permitting quick and easy comparison of large quantities of computer code while minimizing the computational expense of such comparison.

Another object of certain embodiments of the present invention is permitting quick and easy comparison of two or more computer code fragments, in which the comparison takes into account possible register renaming or other small differences in code.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which:

FIG. 2A illustrates an embodiment of a fragment of computer code according to the present invention;

FIG. 2B illustrates an embodiment of a semantics statement of the FIG. 2A computer code according to the present invention;

FIG. 2C illustrates an embodiment of a generalized statement of the FIG. 2B semantics statement according to the present invention;

FIG. 3A illustrates an embodiment of a semantics statement of computer code according to the present invention;

FIG. 3B illustrates another embodiment of a semantics statement of computer code according to the present invention;

FIG. 3C illustrates an embodiment of a generalized statement of computer code according to the present invention;

FIG. 3D illustrates another embodiment of a generalized statement of computer code according to the present invention;

FIG. 4A illustrates an embodiment of a first version of computer code according to the present invention;

FIG. 4B illustrates an embodiment of a second version of computer code according to the present invention;

FIG. 4C illustrates another embodiment of a semantics statement of computer code of FIG. 4A and FIG. 4B according to the present invention;

FIG. 4D illustrates an embodiment of a generalized statement of computer code of FIG. 4A and FIG. 4B according to the present invention;

DETAILED DESCRIPTION OF EMBODIMENTS OF THE INVENTION

Certain embodiments of the system and methods of the present invention may include converting certain computer code into its denotational semantics that is more easily analyzed relative to the binary format of the code.

Figure 1A:
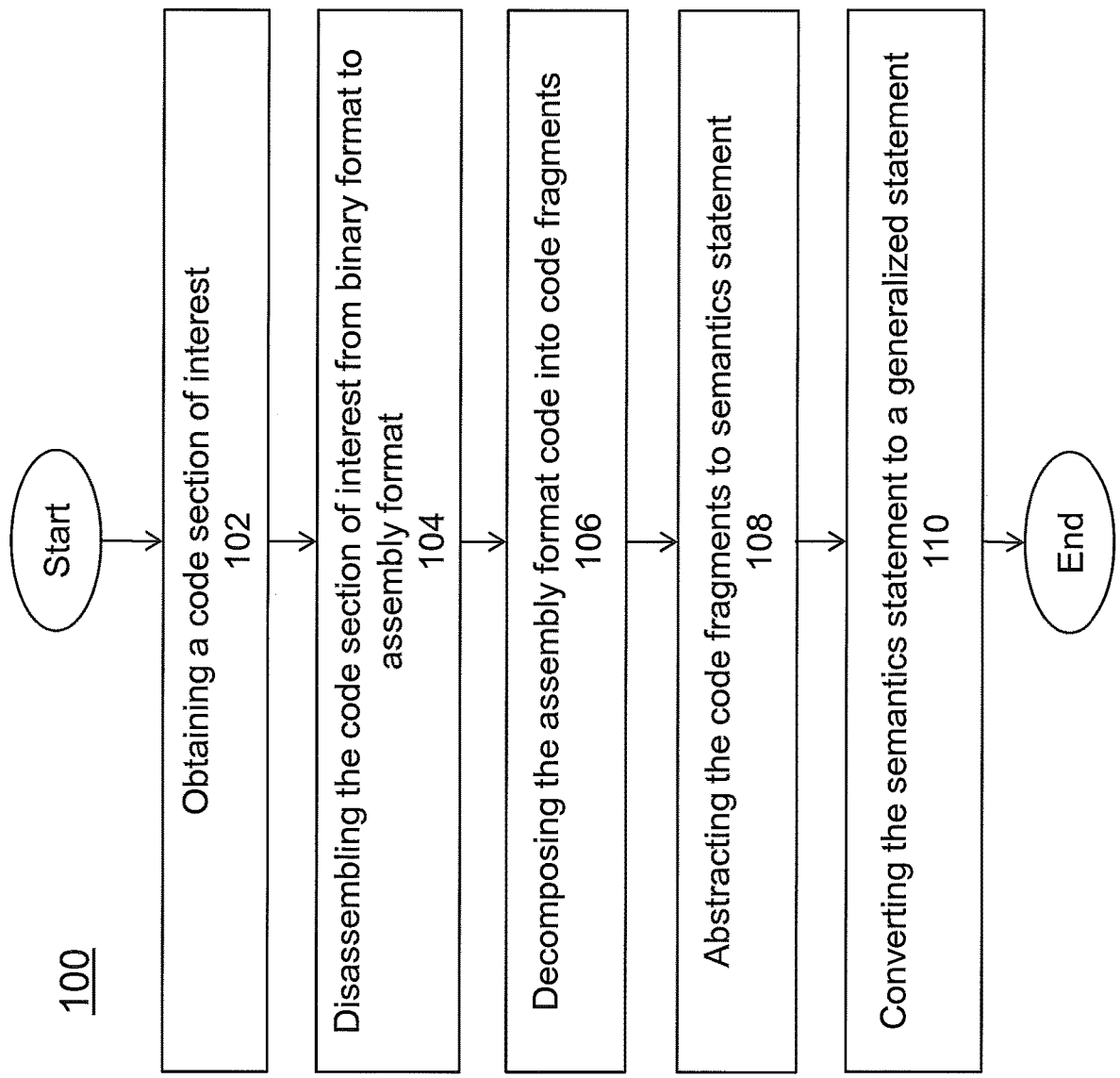
FIG. 1A illustrates an embodiment of a method according to the present invention.

More specifically, as illustrated in FIG. 1A, certain method embodiments 100 of the present invention include obtaining a code section of interest 102. Then, the code section of interest is disassembled 104. Disassembly typically consists of converting the computer code from binary format into an assembly format.

The disassembled code, in assembly format, is decomposed 106. The decomposition step includes breaking the disassembled code into code fragments, where each fragment corresponds to a block of code.

In certain embodiments, the decomposed code may be illustrated as a control flow graph of the code fragment. A control flow graph may be a flow chart mapping the order of actions identified in the code, in which each node in the graph represents a code fragment or basic block of code, i.e. a straight-line piece of code without any jumps or jump targets; jump targets start a block, and jumps end a block. Directed edges may be used to represent jumps in the control flow. There are, in most presentations, two specially designated blocks: the entry block, through which control enters into the flow graph, and the exit block, through which all control flow leaves.

Next, the code fragments are abstracted at a first level abstraction 108. In certain embodiments, the first level abstraction may include mapping a code fragment to a semantics statement. A code fragment is illustrated in FIG. 2A and the respective semantics statement is illustrated in FIG. 2B. More specifically, the operation encoded by an assembly step, such as ADD, is performed on symbolic values. Whenever each operand value is known to be a specific number or a specific sequence of bits, the computation may be performed immediately by the interpreter, thus resulting in a specific value. However, when one or both operands of a binary operator are not specific numbers, i.e., structures, then the operation may be frozen as a structure r1 op r2. Unary operators may be treated similarly. The symbolic interpreter may have the following function signature.

Interpret: seq(Instruction)×State→State where State=LValue→RValue

The semantics statement, a representation of the denotational semantics of a code fragment, denotes its net effect on the state variables represented by the semantic domain, State, defined inductively as follows.

State=LValue→RValue

LValue=Register+Mem

Mem=RValue→RValue

RValue=Int+def(LValue)+(RValue op RValue)+(op RValue)

The set Register may include the set of general purpose registers and also special registers. For example, in Intel x86 architecture the general purpose registers are eax, ebx, etc., and the special purpose registers are esp, eip, ebp, and the flags zf, cf, of, etc. The set Mem represents memory. An element of this set maps an RValue to RValue. The set Int represents the set of numbers. The operator 'def', an element of State, represents the previous state (being updated). The term 'r1 op r2', where r1, r2∈RValue, are symbolic expressions, and 'op' is a binary operator, such as, '+', '−', etc. Similarly, 'op r1', where r1∈RValue represents a unary operator.

Along with forming a semantic statement by symbolic interpretation, a function that performs algebraic simplification of an RValue may be incorporated:

Simplify: RValue→RValue

The function Simplify may utilize the associative, commutative, and distributive properties of operations to transform a symbolic expression to sum-of-product form. The commutative and associative properties are used to reorder operands of an expression into a canonical form. For instance, the expressions:

(def(eax)+2)+def(ebx), (def(eax)+def(ebx))+2, and (2+def(ebx))+def(eax)

all may be transformed to 2+(def (eax)+def (ebx).

The distributive property may be applied to refactor an expression so as to propagate operations of higher precedence deeper within the expression. Accordingly, the expression (def (eax)+2)×def (eax) may be transformed to (def (eax)×def (eax))+(2×def (eax). The algebraic simplifier also includes rules of identities and zeroes of various arithmetic and logical operators. These identities and zeroes also may be used to simplify expressions, such as reducing an expression of the form (def (eax)−def (eax))×def (ebx) to the integer 0.

In addition, a linear order over RValue may be applied to map commutative operations to canonical form. Similar to ordering of ground terms in Prolog, the ordering may be defined by using the names and arity of functions to order terms. For example, a function with smaller arity may be smaller than one with larger arity. Two functions of the same arity typically are ordered using lexicographic ordering of their function names. Numeric values are ordered using numeric order and are considered smaller than functions and symbols.

The semantics of a code segment 'c' is the state 's' resulting from the mapping Interpret (c, def)=s. In an embodiment illustrated in FIG. 2B, the semantic statement is presented as 'updates' to def. The expression 'eax=5' means that upon execution of that block of code, register eax will contain the value 5. Using the linear order over RValue, which is also extended to LValue, a State may be represented as an ordered sequence of pairs of LValue and RValue. With the sorted representation, the semantic statement of two code segments may be compared in linear time with respect to the sizes of their states, or may be tested for equality in constant time using their hashes.

An algebraic simplifier's ability to map equivalent code to the same semantic structure depends on, among other things, whether the rewrite rules used by Simplify are confluent. Completing a set of rewrite rules to make the set confluent is an undecidable problem. Accordingly, the simplifier does not in any way bypass undecidability. However, a simplifier based on (known) algebraic equalities may normalize a large set of expressions, so as to be useful on real-world code.

The second level of abstraction—that is, converting the semantics statement to a generalized statement 110—may include completely different steps than the first level of abstraction. For example, the semantics statement may be simplified by replacing ground terms with logical variables. More specifically, the simplification of a semantics statement to a generalized statement may be performed by consistently replacing register names with logical variables. The replacement is consistent if two occurrences of the same register name are always replaced by the same and unique logical variable. In addition to simplifying the registers used, one may also recharacterize the literal constants. In the example illustrated in FIG. 2B, the semantics 'ebx=def (ebx)×5+20' may be recharacterized to 'B=def (B)×N1+N2' by consistently renaming its registers and literal constants. The type of the variables introduced may follow directly from the type of the term replaced. Since the logical variable B may replace the 32-bit register eax, it follows that "B" is of type reg32. Similarly, it follows that N1 and N2 are of type Int in the example.

The algebraic constraints between the logical variables may be produced, for example, the constraint 'N2=N1×N3' in FIG. 2C. The algebraic constraints are produced by augmenting the symbolic interpreter to track the simplifications it performs. In the example illustrated in FIG. 2A-2C, the term 20 in the expression 'def (ebx)×5+20' results from the immediate simplification of the expression 5×4, which follows from the distributive property of multiplication. In the illustrated example, the interpreter will annotate the semantics with the tautology '20=5×4'. Then, the annotations also are generalized along with the semantic statements. Thus, the term 20 is replaced by N2 and 5 by N1 in both the annotation and the semantics, yielding the constraint 'N2=N1×N3' as the generalized statement.

Overall, the generalization statement is configured to correspond to the essential relations established by a code fragment, independent of choices of registers and literal constants. The generalization statement then serves as a template of the code fragment that is invariant against certain choices made by compilers or by code obfuscation tools.

The embodiment illustrated by FIG. 2A-FIG. 2C is discussed in more detail below.

As described above, FIG. 2 illustrates an example of binary code in FIG. 2A, its semantics statement in FIG. 2B, and its generalized statement in FIG. 2C. More specifically, FIG. 2A includes a hex dump of an executable code fragment along with its disassembled code, FIG. 2B contains the denotational semantics of the code fragment. The semantics statement may give the result of executing the code fragment as a function of the state before execution. This state is given by the function 'def' (for default). Thus, def (ebx) may represent the content of the 32-bit register ebx at the entry of the code fragment. The semantics statement may indicate that upon execution of the code fragment, the register eax will contain the value 5 and the register ebx will contain the result of multiplying def (ebx) by 5 and adding 20. The presented semantics also contains the steps in computing the value of ebx. It is assumed that the state of all other register and memory locations remain unchanged. For simplicity the affect on the flag registers may not be included in the generalized statement. The generalized statement is computed by replacing in the semantics the register names and literal constants with typed variables and introducing algebraic constraints. In the illustrated example of a generalized statement, the symbols N1, N2, and N3 signify values of numeric type and the other symbols are 32-bit registers. The generalized statement shows that the register variable A will contain number N1 and register variable B will contain the number computed by multiplying the previous value of B by number N1 and adding number N2. Further, numbers N1 and N2 are related using a third number N3 such that number N2 is equal to number N1 multiplied by number N3. In other words, number N3 is a multiple of number N1.

As illustrated by the above example, the generalized statement of a code fragment is a second level abstraction of its semantics statement, which in turn is a first level abstraction of code in binary format. In the above example, the semantics statement in FIG. 2B may be used to represent all code fragments that result in eax containing the value 5 and ebx containing the value def (ebx)×5+20, leaving all other registers and memory unchanged. The generalized statement, in comparison, represents all code fragments whose semantics can be abstracted as the given algebraic and type constraints. In the above example, the generalized statement represents all code fragments that result in one 32-bit register (A) containing some specific number (N1) and the value in a second 32-bit register (B) being multiplied by the previous value (N1) and summed with a second number (N2), where N2 is a multiple of N1.

The generalized statement may be computed at varying degrees of abstractions. For example, at the lowest degree within the second level abstraction, one may simplify the register names, but not the literal constants. Such a simplification may be used to relate code fragments that have the same semantics, modulo register names. In another embodiment, the literal constants may be generalized but the algebraic and register size constraints may remain unsimplified, thus significantly expanding the code fragments that may be placed in an equivalence class. In the example FIG. 2C deleting the constraint "where N2=N1×N3 and type (A)=type(B)=reg32" will create a generalized statement in which the register size and algebraic constraints are not simplified. The resulting generalized statement may relate all code fragments with the semantics statement that one register, A, of any size contains some number, such as N1, and a second register, B, contains the def (B)×N1+N2, where N2 is some number (with no explicit relation to N1).

In certain embodiments, the system may compute the semantics statement and the generalized statement of individual blocks of instructions, where a block is defined in the classical sense. The generalized statement of a block may be comprised of one or more of three components: the generalized semantics, the generalized algebraic constraints, and the type constraints. Depending on the embodiment, one may use the code (from the original program), the semantics statement, or the generalized statement at any of the varying levels of abstractions.

Figure 1B:
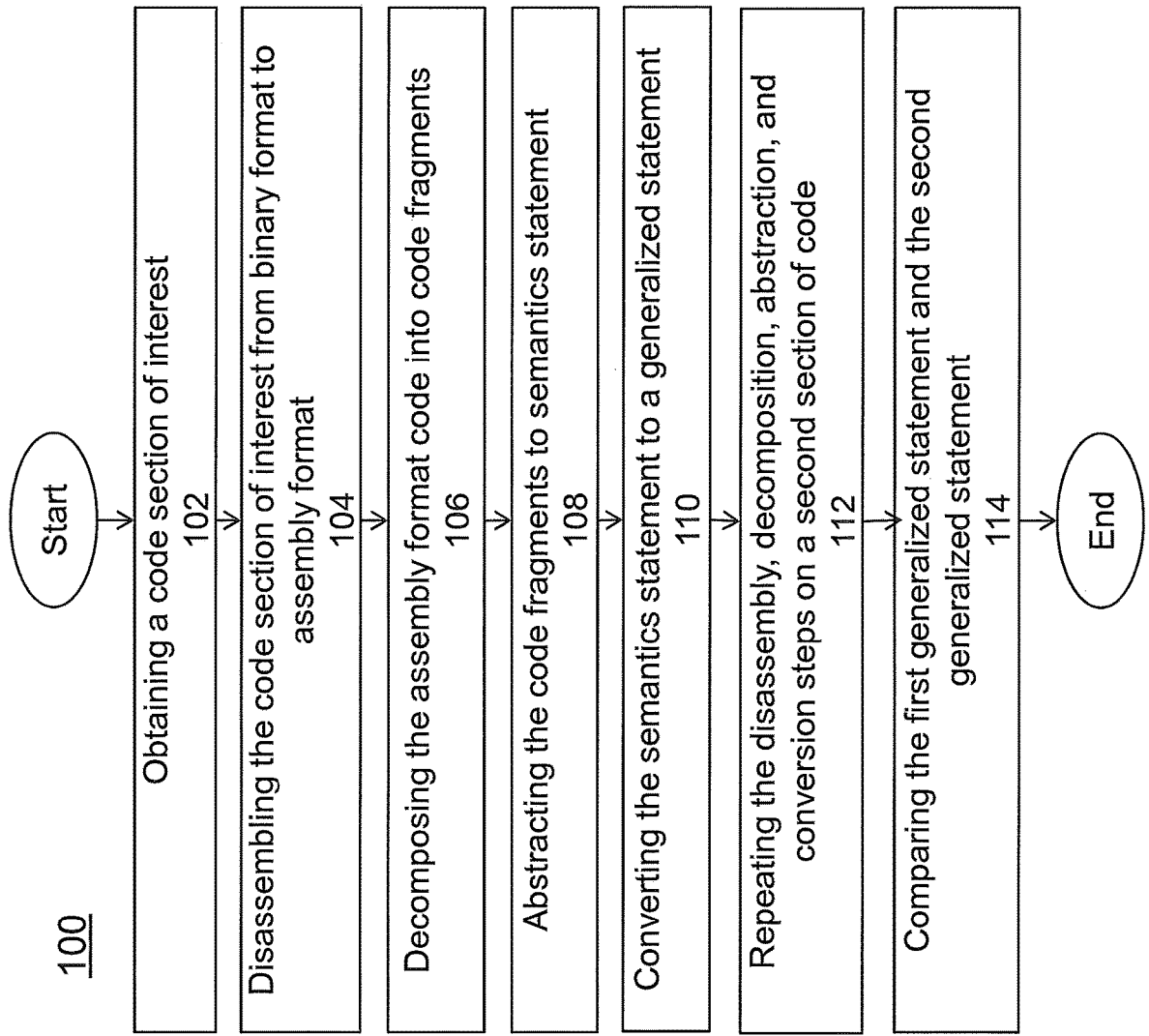
FIG. 1B illustrates another embodiment of a method according to the present invention.

After converting the semantic statement to a generalized statement for one set of code (maybe the code section of interest), the system of the present invention may repeat the disassembling, decomposition, abstraction, and conversion steps on a second set of code (e.g., an established code) 112, as illustrated in FIG. 1B. Each application of the method may result in a generalized statement. Accordingly, at least a first generalized statement and a second generalized statement may be compared 114. The comparison may include assessing whether or to what extent the generalized statements match. More specifically, in the assessment, any equivalent terms in the respective generalized statements can be mapped to a canonical form. However, the existence of logical variables in the generalized statement may be resolved in a number of ways. One possibility is to name these logical variables in the order in which substitutions are performed, and use the resulting order for comparison. Then the generalized statement can be ordered using this linear order. When two ordered terms in a generalized statement match, the corresponding code fragments are likely to be equivalent, modulo renaming of variables and literal constants. However, it is also possible that a different ordering of variables may lead some other pairs of terms to match, and, accordingly, identify other sets of equivalent code fragments. Thus, even though an arbitrary order imposed on logical variables may correctly identify equivalent code fragments, the output may not include some matches.

Since an arbitrary order of logical variable may not produce satisfactory matching, an alternative method treats the logical variables of the generalized statement as unordered. This leads to a partial order of terms in which two equations in the generalized statement of a code fragment cannot be ordered linearly if and only if they are variants of each other, i.e., they are identical except for the variables. FIG. 3A-3D shows an example of this point. FIG. 3A and FIG. 3B contain the semantics statements for two code fragments. The semantics statements are equivalent, except for the choice of registers. The semantics statement in FIG. 3A may be transformed to that in FIG. 3B by replacing the register eax by ecx. The two semantics naturally result in generalized statements that differ only by the logical variables. One such generalized statement is given in FIG. 3C. Whereas the terms in the semantics statement could be linearly ordered, the same is not true of the generalized statement. The two terms 'R1=N1' and 'R2=N2' cannot be ordered. The same is true of the other two terms.

FIG. 3D shows another embodiment of a generalized statement that trades safety for an increase in the set of code fragments that may be considered equivalent. This embodiment takes advantage of the observation mentioned above that only mutually variant terms in a generalized statement cannot be ordered. In this embodiment, the variant terms in the generalized statement are unified, yielding a structure that is linearly ordered. As is evident from the example, such a generalization may result in a significant loss and may be useful only in certain circumstances.

Figure 1C:
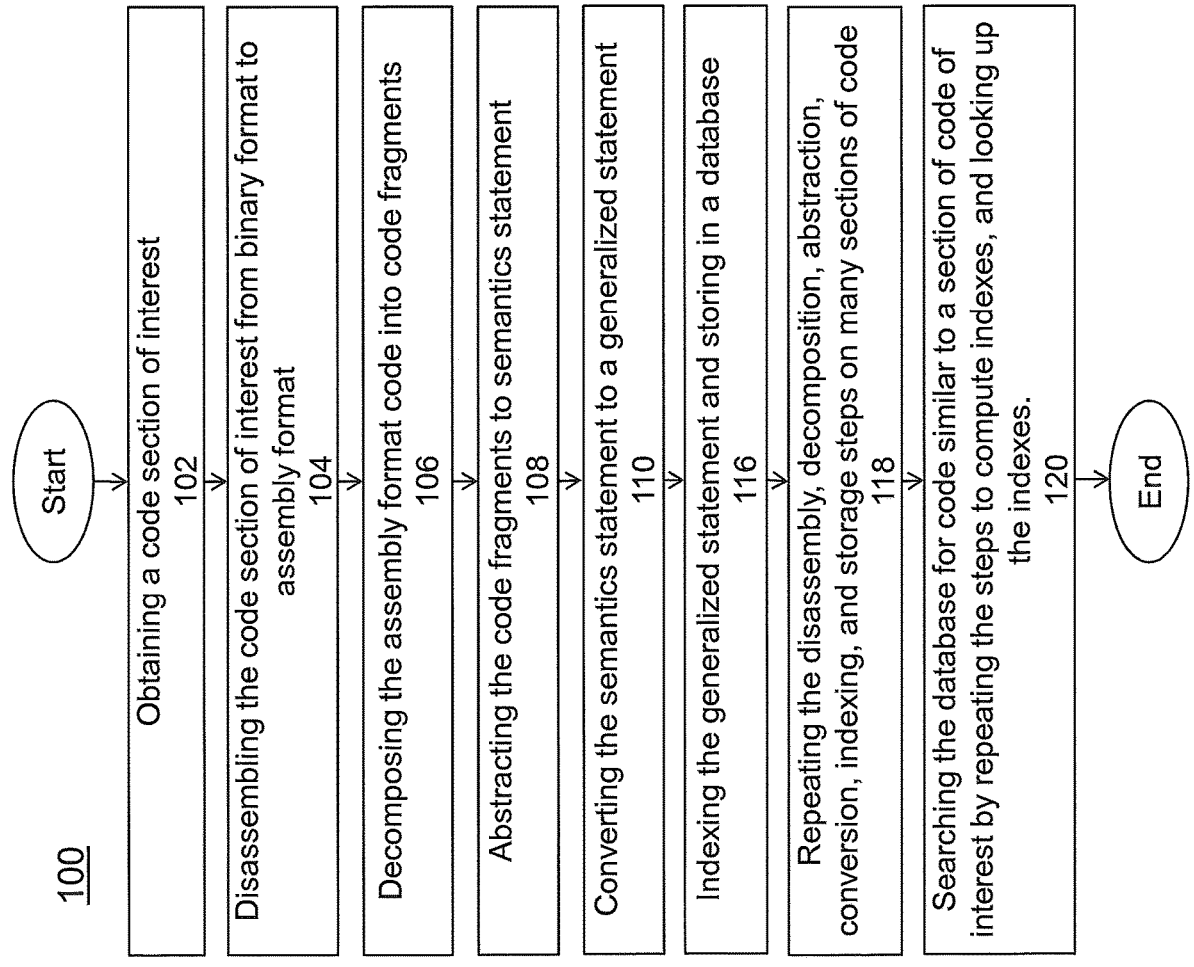
FIG. 1C illustrates a third embodiment of a method according to the present invention.

Another embodiment of the present invention is illustrated in FIG. 1C. After converting the semantic statement to a generalized statement for one set of code, the system of the present invention may compute an index for one or more generalized statements, and store the information in a database 116. The present invention may repeat the steps of disassembling, decomposition, abstraction, conversion, indexing, and storage for a plurality set of code 118. It may then search for similar code for a section of code of interest by disassembling, decomposing, abstracting, converting, and indexing its one or more generalized statements 120. The similar code sections will be found by using the indexes to look up the database.

FIG. 4A-FIG. 4D shows an example of the present invention using the metamorphic engine of Win32.Evol. The first code fragment is illustrated in FIG. 4A and a second code fragment is illustrated in FIG. 4B. The first and second code fragments may correspond to the respective blocks of the two versions of the malware and, at least in this embodiment, are semantically equivalent. FIG. 4C shows their (identical) extracted semantics statement, and it also shows the tautologies used in algebraic simplification for version of code illustrated in FIG. 4A. The example may be indicative of all the version of Win32.Evol. The semantics statement can be used to identify corresponding blocks of code for versions even though the code for the blocks may be transformed. FIG. 4D shows the corresponding generalization statement along with the algebraic constraints.

Figure 5:
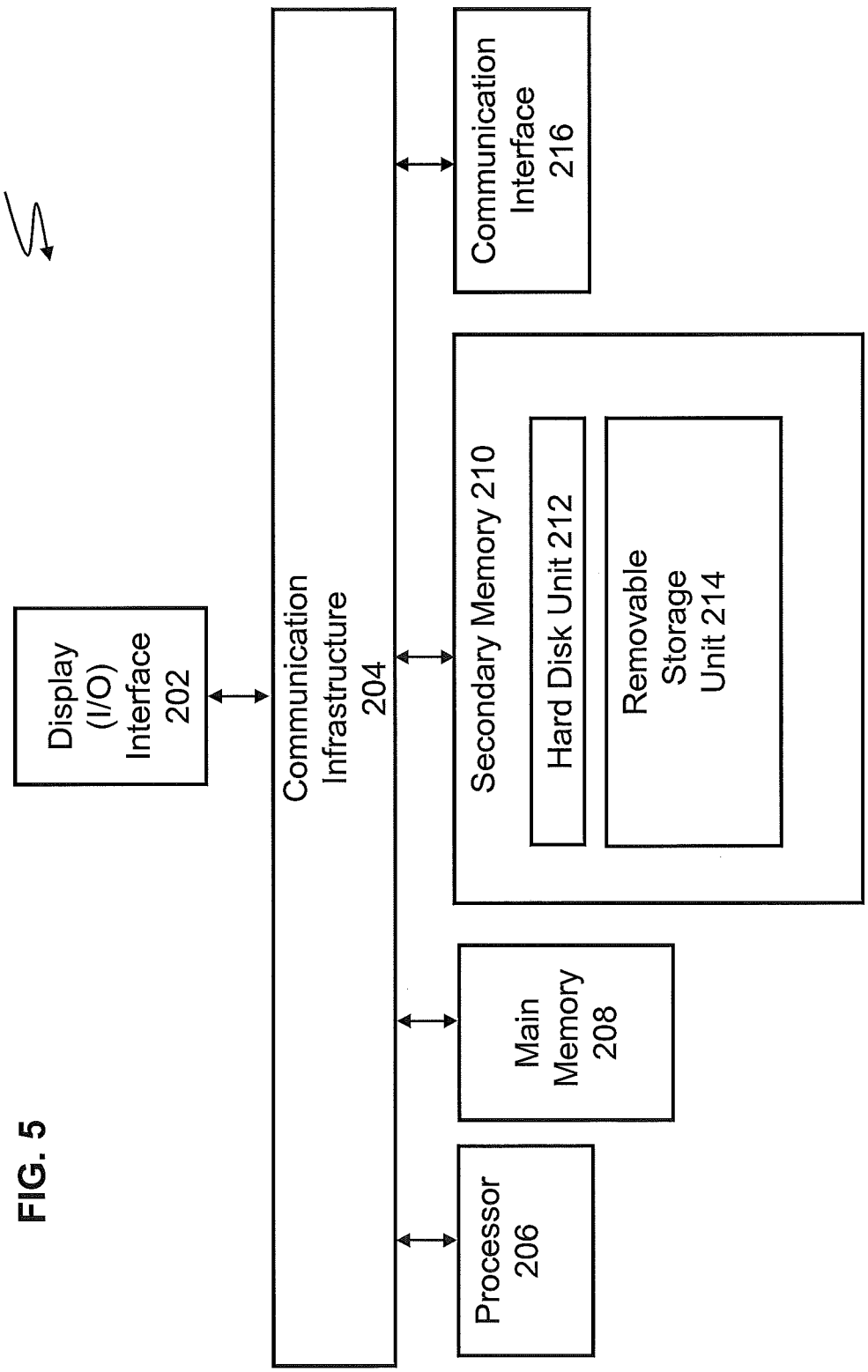
FIG. 5 illustrates an exemplary computer system.

The semantics statement and generalized statements may be used to accurately pair corresponding blocks at least when they were transformed by equivalence preserving transformations. In the illustrated embodiment, Win32.Evol contains transformations that, while preserving the semantics statements of the overall program, do not preserve the semantics of a block. For instance, it may include transformations that introduce computation on registers that are known to be dead at the end of the block. In such a situation, the intersection of the semantics of the corresponding blocks always yields the correct semantics though the two semantics are not structurally equal. FIG. 5 illustrates an exemplary computer system 200 that may be used to implement the methods according to the invention. One or more computer systems 200 may carry out the methods presented herein as computer code.

Computer system 200 includes an input/output display interface 202 connected to communication infrastructure 204—such as a bus —, which forwards data such as graphics, text, and information, from the communication infrastructure 204 or from a frame buffer (not shown) to other components of the computer system 200. The input/output display interface 202 may be, for example, a keyboard, touch screen, joystick, trackball, mouse, monitor, speaker, printer, Google Glass® unit, webcamera, any other computer peripheral device, or any combination thereof, capable of entering and/or viewing data.

Computer system 200 includes one or more processors 206, which may be a special purpose or a general-purpose digital signal processor configured to process certain information. Computer system 200 also includes a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods presented herein. It is also contemplated that the methods according to the invention may be performed automatically, or may be invoked by some form of manual intervention.

The computer system 200 of FIG. 5 is provided only for purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 6:
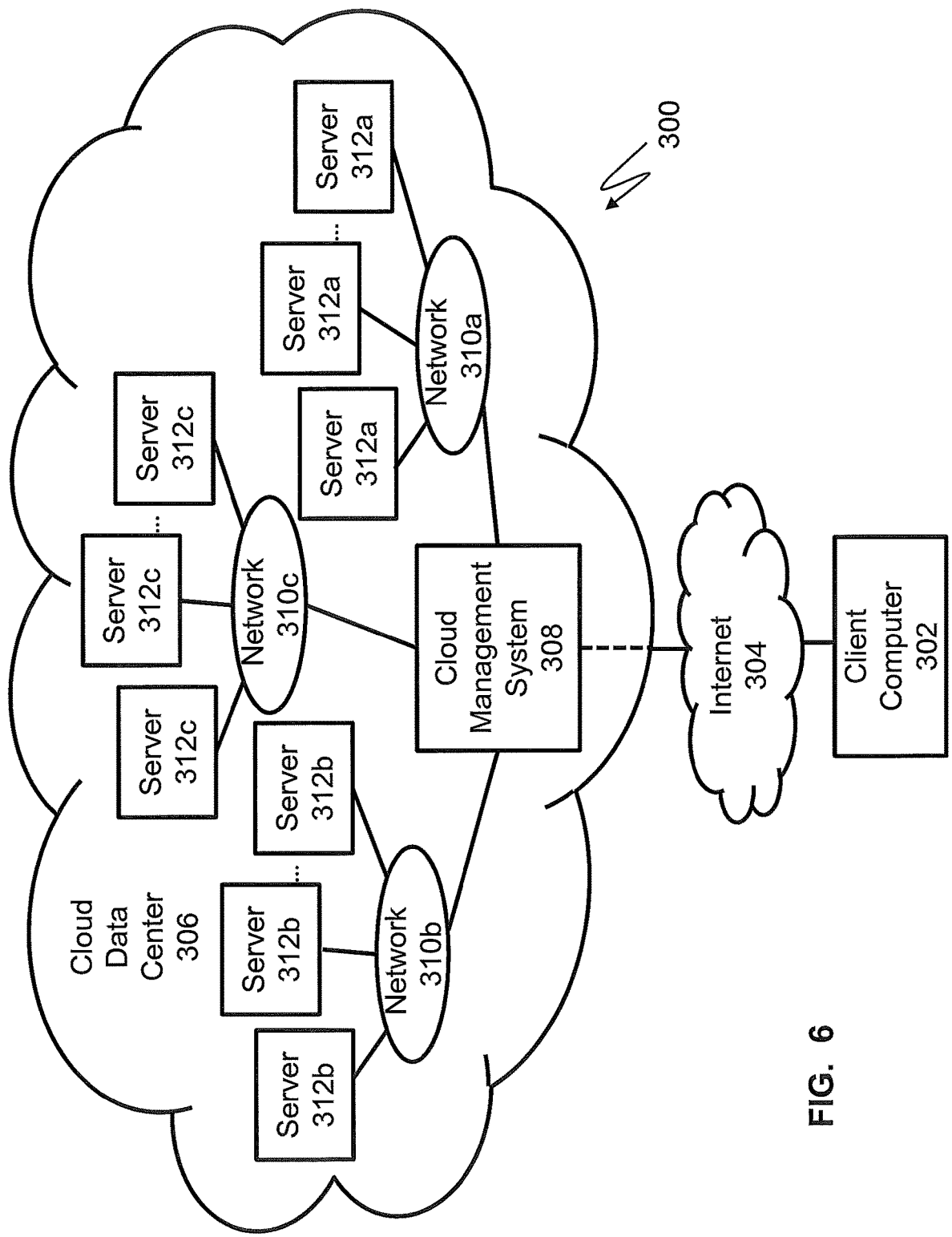
FIG. 6 illustrates an exemplary cloud computing system.

FIG. 6 illustrates an exemplary cloud computing system 300 that may be used to implement the methods according to the present invention. The cloud computing system 300 includes a plurality of interconnected computing environments. The cloud computing system 300 utilizes the resources from various networks as a collective virtual computer, where the services and applications can run independently from a particular computer or server configuration making hardware less important.

Specifically, the cloud computing system 300 includes at least one client computer 302. The client computer 302 may be any device through the use of which a distributed computing environment may be accessed to perform the methods disclosed herein, for example, a traditional computer, portable computer, mobile phone, personal digital assistant, tablet to name a few. The client computer 302 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 302 also includes a communications interface, for example, a modem, a network interface (such as an Ethernet card), a communications port, a PCMCIA slot and card, wired or wireless systems, etc. The communications interface allows communication through transferred signals between the client computer 302 and external devices including networks such as the Internet 304 and cloud data center 306. Communication may be implemented using wireless or wired capability such as cable, fiber optics, a phone line, a cellular phone link, radio waves or other communication channels.

The client computer 302 establishes communication with the Internet 304 to one or more servers to, in turn, establish communication with one or more cloud data centers 306. A cloud data center 306 includes one or more networks 310a, 310b, 310c managed through a cloud management system 308. Each network 310a, 310b, 310c includes resource servers 312a, 312b, 312c, respectively. Servers 312a, 312b, 312c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 308 can comprise a dedicated or centralized server and/or other software, hardware, and network tools to communicate with one or more networks 310a, 310b, 310c, such as the Internet or other public or private network, with all sets of resource servers 312a, 312b, 312c. The cloud management system 308 may be configured to query and identify the computing resources and components managed by the set of resource servers 312a, 312b, 312c needed and available for use in the cloud data center 306. Specifically, the cloud management system 308 may be configured to identify the hardware resources and components such as type and amount of processing power, type and amount of memory, type and amount of storage, type and amount of network bandwidth and the like, of the set of resource servers 312a, 312b, 312c needed and available for use in the cloud data center 306. Likewise, the cloud management system 308 can be configured to identify the software resources and components, such as type of Operating System ("OS"), application programs, and the like, of the set of resource servers 312a, 312b, 312c needed and available for use in the cloud data center 306.

The present invention is also directed to computer products, otherwise referred to as computer program products, to provide software to the cloud computing system 300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 300 of FIG. 6 is provided only for purposes of illustration and does not limit the invention to this specific embodiment. It is appreciated that a person skilled in the relevant art knows how to program and implement the invention using any computer system or network architecture.

Figure 7:
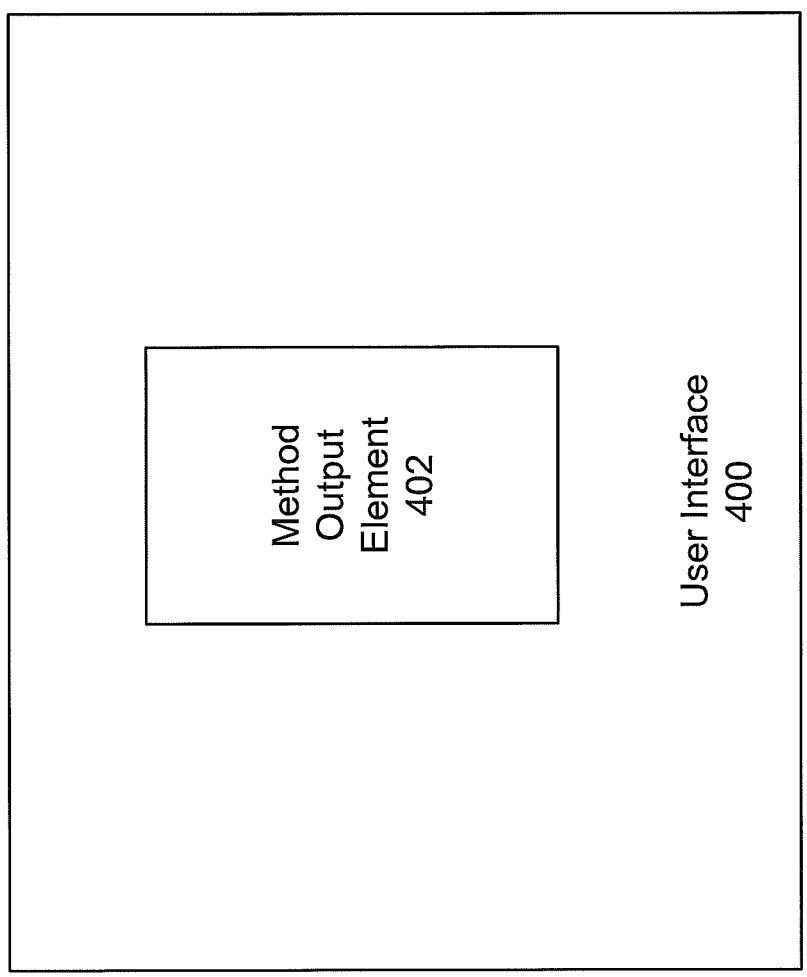
FIG. 7 illustrates an exemplary user interface.

FIG. 7 illustrates a user interface 400 according to the present invention. A user interface 400 may include a method output element 402 configured to display an illustration of the results of the method, e.g., whether and to what extent the compared code fragments match.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for analyzing versions or variants of potentially malicious computer code to locate code components that have the same effect on a system's state variable though potentially using different sequences of instructions, comprising:

a processor;
a main memory in communication with the processor via a communication infrastructure and storing the different instructions that, when executed by the processor, cause the processor to:
obtain a first section of computer code in a binary executable file format;
disassemble the first section of code in the binary executable file format to form a section of code in assembly format;
decompose the section of computer code in assembly format into one or more code fragments;
perform a first level of abstraction on at least one of the one or more code fragments to acquire at least one semantics statement, comprising mapping a code fragment to a semantics statement, wherein each semantics statement summarizes changes made by one or more instructions of the code fragment to one or more state variables of the processor, the changes described in a form independent of the instructions of the code fragment;
apply a second level of abstraction on the at least one semantics statement to result in at least one first generalized statement, comprising consistently replacing one or more register names of the semantics statement with one or more logical variables wherein said replacement is consistent if two occurrences of identical register names are always replaced by the same unique logical variable;
computing an index for one or more generalized statements;
storing the index in a database;

repeating the obtain step, disassemble step, decompose step, perform step, and apply step to a second section of computer code, resulting in at least one second generalized statement;

comparing the at least one first generalized statement to the at least one second generalized statement to form a comparison, the comparison showing the similarity between the changes made to one or more state variables of the processor by one or more instructions of the code fragment on the first section of computer code and the changes made to one or more state variables of the processor by one or more instructions of the code fragment of the second section of computer, and producing an output related to the comparison;

wherein the main memory in communication with the processor via communication infrastructure and storing instructions that, when executed by the processor, cause the processor to index the at least one first generalized statement and the at least one second generalized statement, and storing the index in a database, wherein said database is a cloud computing database; and wherein a result is displayed to a user.

2. The system of claim 1, wherein the comparison is configured for display with a user interface.

3. The system of claim 1, wherein the main memory for communication with the processor via a communication infrastructure and storing instructions that, when executed by the processor, cause the processor to search the database for computer code similar to a section of computer code of interest by repeating the disassemble step, decompose step, perform step, apply step and indexing step to the computer code of interest and comparing the indexes for similarity.

4. The system of claim 1, wherein the symbolic interpretation includes the step of interpreting the one or more code fragments using symbolic values comprising a mathematical expression.

5. The system of claim 4, wherein the mathematical expression is in canonical form.

6. The system of claim 1, wherein the one or more state variables comprise registers, flags, memory locations, I/O devices.

7. A method for analyzing two versions or variants of potentially malicious computer programs to locate components that have the same effect on a system's state variables through potentially using different sequences of instructions, comprising:

obtaining a first section of computer code in a binary executable file format;

disassembling the first section of code in the binary executable file format to form a section of code in assembly format;

decomposing the section of computer code in assembly format into one or more code fragments;

performing a first level of abstraction on at least one of the one or more code fragments to acquire at least one semantics statement, comprising mapping a code fragment to a semantics statement, wherein each semantics statement summarizes changes made by one or more instructions of the code fragment to one or more state variables of the processor, the changes described in a form independent of the instructions of the code fragment;

applying a second level of abstraction on the at least one semantics statement to result in at least one first generalized statement, comprising consistently replacing one or more register names of the semantics statement with one or more logical variables wherein said replacement is consistent if two occurrences of identical register names are always replaced by the same unique logical variable;

computing an index for one or more generalized statements;

storing the index in a database;

repeating the obtain step, disassemble step, decompose step, perform step, and apply step to a second section of computer code, resulting in at least one second generalized statement;

comparing the at least one first generalized statement to the at least one second generalized statement to form a comparison, the comparison showing the similarity between the changes made to one or more state variables of the processor by one or more instructions of the code fragment on the first section of computer code and the changes made to one or more state variables of the processor by one or more instructions of the code fragment of the second section of computer, and producing an output related to the comparison;

wherein the main memory in communication with the processor via communication infrastructure and storing instructions that, when executed by the processor, cause the processor to index the at least one first generalized statement and the at least one second generalized statement, and storing the index in a database, wherein said database is a cloud computing database; and wherein a result is displayed to a user.

8. The method of claim 7, wherein the comparison is configured for display with a user interface.

9. The method of claim 7, indexing the at least one first generalized statement and the at least one second generalized statement, and storing the index in a database.

10. The method of claim 9, searching the database for computer code similar to a section of computer code of interest by repeating the interpret step, the simplify step and indexing step to the computer code of interest and comparing the indexes for similarity.

11. The method of claim 7, wherein the at least one of the one or more code fragments is symbolically interpreted using symbolic values comprising a mathematical expression.

12. The method of claim 11, wherein the mathematical expression is in canonical form.

13. The method of claim 7, wherein the one or more state variables comprise registers, flags, memory locations, I/O devices.

14. A non-transitory computer-readable storage medium for analyzing for similar computer code in a collection of versions and variants of potentially malicious computer programs to locate code that have the same effect on the system's state variables through potentially using different sequences of instructions, comprising:

obtaining a first section of computer code in a binary executable file form at;

disassembling the first section of code in the binary executable file format to form a section of code in assembly format;

decomposing the section of computer code in assembly format into one or more code fragments;

performing a first level of abstraction on at least one of the one or more code fragments to acquire at least one semantics statement, comprising mapping a code fragment to a semantics statement, wherein each semantics statement summarizes changes made by one or more instructions of the code fragment to one or more state variables of the processor, the changes described in a form independent of the instructions of the code fragment;

applying a second level of abstraction on the at least one semantics statement to result in at least one first generalized statement, comprising consistently replacing one or more register names of the semantics statement with one or more logical variables wherein said replacement is consistent if two occurrences of identical register names are always replaced by the same unique logical variable;

computing an index for one or more generalized statements;

storing the index in a database;

repeating the obtain step, disassemble step, decompose step, perform step, and apply step to a second section of computer code, resulting in at least one second generalized statement;

comparing the at least one first generalized statement to the at least one second generalized statement to form a comparison, the comparison showing the similarity between the changes made to one or more state variables of the processor by one or more instructions of the code fragment on the first section of computer code and the changes made to one or more state variables of the processor by one or more instructions of the code fragment of the second section of computer, and producing an output related to the comparison;

wherein the main memory in communication with the processor via communication infrastructure and storing instructions that, when executed by the processor, cause the processor to index the at least one first generalized statement and the at least one second generalized statement, and storing the index in a database, wherein said database is a cloud computing database; and wherein a result is displayed to a user.

15. The non-transitory computer-readable storage medium of claim 14, wherein the at least one section of computer code is obtained from at least a first computer program and at least a second computer program.

16. The non-transitory computer-readable storage medium of claim 14, wherein the first level of abstraction includes symbolic interpretation using symbolic values comprising a mathematical expression in canonical form.

17. The non-transitory computer-readable storage medium of claim 14, wherein the one or more state variables comprise registers, flags, memory locations, I/O devices.

* * * * *